July 29, 1969  E. H. HARBARD  3,457,919
ADHESIVE SURGICAL AND OTHER TAPES, PLASTERS, BANDAGES,
DRESSINGS, AND THE LIKE
Filed June 22, 1966  2 Sheets-Sheet 1

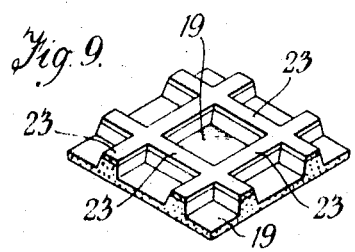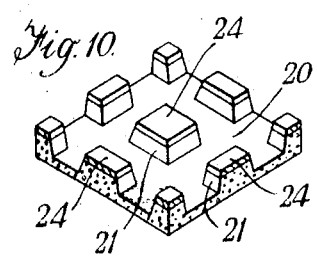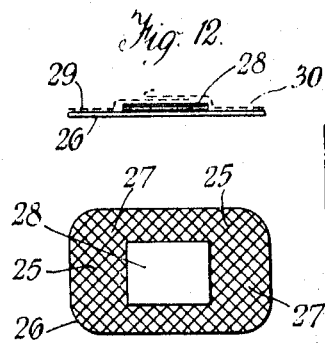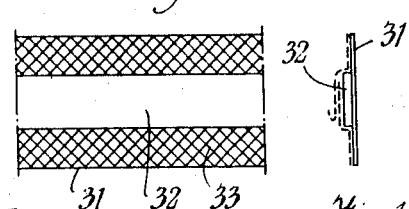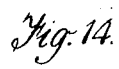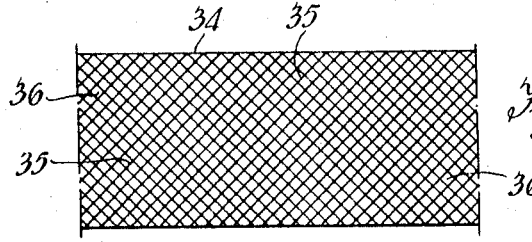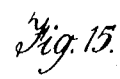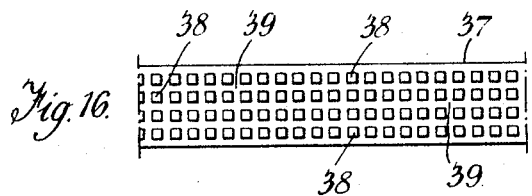

United States Patent Office 3,457,919
Patented July 29, 1969

3,457,919
ADHESIVE SURGICAL AND OTHER TAPES, PLASTERS, BANDAGES, DRESSINGS, AND THE LIKE
Edward H. Harbard, Kirk Ella, England, assignor to T. J. Smith & Nephew Limited, Kingston-upon-Hull, England
Filed June 22, 1966, Ser. No. 559,593
Int. Cl. A61l *15/01, 15/06*
U.S. Cl. 128—156                                    10 Claims

ABSTRACT OF THE DISCLOSURE

A method of producing microporous pressure sensitive adhesive film comprises the steps of mixing a synthetic thermoplastic material with a soluble filler, forming a film from said mixture, embossing said film on at least one side surface thereof to form a design pattern having high and low level areas, removing said soluble filler from the film, and coating said high level areas with a pressure sensitive adhesive.

---

The present invention relates to improvements in adhesive surgical dressings and other tapes, plasters, bandages and the like of the type in which a microporous synthetic resin or thermoplastic film of relatively thin section is provided on one face or surface with a pressure sensitive adhesive.

One object of the invention is to provide a method of manufacturing various tapes, plasters, bandages and surgical dressings in which a microporous synthetic plastic sheet is formed on one of its faces with a plurality of embossed designs of regular and uniform shape to form rib-like projections extending in various directions to outline small recessed areas and thus provide an air space between the surface to which the tape or the like is applied and the tape in general.

Another object is to provide a method of manufacturing microporous synthetic resin or thermoplastic film in which the embossed rib-like projections are coated with a pressure sensitive adhesive, thus leaving the remaining area confined by said rib-like projections uncoated and spaced from the surface to which the tape, plaster, bandage or surgical dressing is applied.

Another object is to provide adhesive tapes and the like for surgical and other purposes in which one face of the adhesive tape is provided with a plurality of rib-like projections having a pressure sensitive adhesive on the edges of said projections so that air will pass through perforations in the synthetic resin or thermoplastic film in the areas defined by the rib-like projections and thus ventilate the area and permit water vapor to contact parts covered by said tape throughout a large area of the part covered.

Hitherto, a main difficulty in producing such microporous film, particularly but not exclusively in the case of adhesive surgical dressings, has been to provide adequate and uniform spread of the adhesive on one surface of the film, while leaving a sufficient area of the film free of adhesive for the passage of air and water vapor.

According to the present invention, the microporous film is formed from the synthetic resin composition which includes a removable filler, and this is mixed to the consistency of a paste and then extruded or cast to form a thin film. The film is then embossed on one surface in any approved manner so that part of its area is at a high level, while the remaining part is at a lower level. The rib-like projections forming the high and low level portions are arranged in an approximately uniform manner over the entire area of the surface, and then the filler is removed by subjecting the film to a suitable liquid bath to thereby remove and dissolve the filler. In many practical forms the embodiment preferably comprises a uniform raised pattern of similar spaced apart embossments, or a crossing and diamond-like or other arrangement of rib-like projections or lines, the embossments may be relatively deep in relation to the remaining thickness of the film at the base of the embossments. The removable filler may be finely divided starch or it may be a water-soluble solid which can be obtained in fine particles such as sugar or common salt or other inert water-soluble inorganic salt, enabling water to be used as the leaching agent for removing it.

The particle size of the removable filler may suitably be from 10 to 50 microns to ensure adequate permeability to water vapor and satisfactory water-proofness of the microporous film resulting from its removal.

In the present invention, embossing of the thin microporous synthetic resin film results in providing an upper surface of the film with high areas at the top of the embossments and lower areas at the base of the embossments, the underside of the film being flat to provide a smooth surface.

In the next step of the process according to the present invention, a coating of adhesive is applied to the rib-like projections along the outer edges thereof which define uncoated areas of the film-like tape. Various types of pressure sensitive adhesive material can be used and can be spread on the raised embossed portions by means of a suitable transfer unit.

The resulting microporous film, particularly but not exclusively for use as surgical dressings and uniformly coated with adhesive on one surface to define uncoated areas, is obtained and in this arrangement the uncoated areas permit ventilation of those areas corresponding to the surface of which the film is applied.

If desired, the areas which receive the adhesive may be spread with a key-coat before the pressure sensitive adhesive is applied.

In particular ways in which the invention may be carried out the film mixture is cast on a paper backing and can be embossed while still hot on the paper backing after casting before it has cooled or by re-heating it after cooling.

It will be appreciated, that the shape and arrangement of the embossments may be such that although uniformly spread out in a plurality of separate positions, the high areas may have a total area which may be equal to, or more than, or less than the total sum of the areas which are not coated with adhesive; it most cases, for surgical plasters, bandages or dressings, it is preferable that the total sum of the uncoated areas should be greater.

Other objects and advantages of the invention will become apparent during the course of the following description of the accompanying drawings, wherein:

FIGURE 9 illustrates a portion of the film as shown in FIGURE 7 on a slightly increased scale with the high level areas of the embossed portions provided with an adhesive coating.

FIGURE 10 is a view similar to FIGURE 9, but showing a portion of the film or tape illustrated in FIGURE 8.

FIGURE 11 and 12 represent plan and side elevational views respectively of a surgical dressing in accordance with the present invention.

FIGURE 13 and FIGURE 14 are plan and end elevational views respectively of a portion of an elongated band of surgical dressing, adapted to be cut into desired lengths, and in which the backing is a microporous film as shown in FIGURE 9.

FIGURE 15 is a plan view of a length of microporous film bandage formed from a coated film as shown in FIGURE 9, and FIGURE 16 is a plan view showing a length of industrial or surgical tape formed from a coated microporous film as shown in FIGURE 10.

Figure 1:
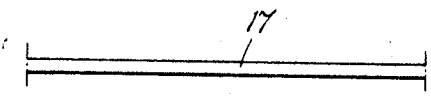
FIGURES 1 and 2 represent side elevational and plan views respectively, showing a portion of a sheet or film of thermoplastic material, the mixture from which it is formed including a removable filler before casting and embossing and from which a tape, plaster, bandage or other dressing is to be made.
Figure 2:
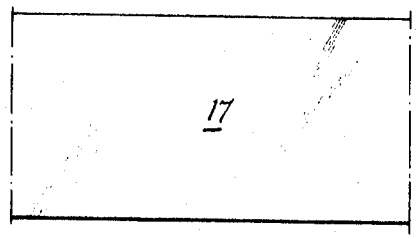
Figure 3:
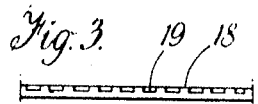
FIGURE 3 is a side elevational view showing the manner in which the sheet material of FIGURE 1 is embossed in the embossing step.
Figure 4:
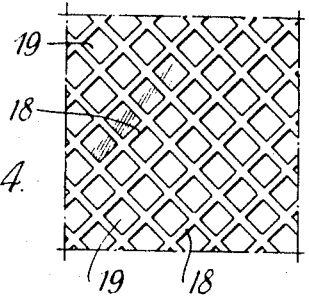
FIGURE 4 is a plan view showing the embossed design applied to the plastic sheet or film in the embossing step.

In the form of the invention shown in FIGURES 1 to 4 and 7 inclusive a film sheet or the like of synthetic thermoplastic material 17 is formed and includes a soluble filler. After the film sheet or the like is formed it is embossed by passing the sheet or film through a pair of embossing rollers before the same is hardened, the periphery of one of which is provided with a suitable design face to emboss the sheet to provide a waffle-like surface (FIGURES 3, 4 and 7) comprising a series of upwardly extending cross ribs 18 forming cellular recesses or the like 19. FIGURE 3 illustrates the approximate depth of the cellular recesses and the height of the rib projections surrounding each cell after the sheet has been embossed. The design pattern of FIGURES 3 and 4 provides crisscross rib projections, the upper surfaces of which provide high level areas 18. After embossing, the soluble filler is removed by leaching the film with a suitable solvent, which may be water when a water-soluble filler has been employed.

Figure 7:
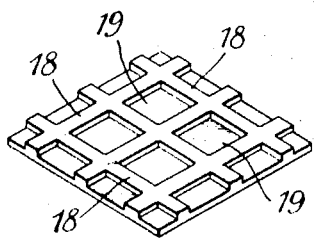
FIGURE 7 is a perspective view showing a portion of tape or the like after it has been embossed, and is enlarged slightly to indicate the depth of the embossments and embossing arrangement to provide a series of crossed rib-like projections.
Figure 8:
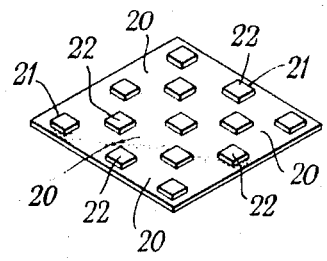
FIGURE 8 is a perspective view slightly enlarged of the form of the invention shown in FIGURE 6.

The high level areas 18 of the leached film or sheet shown in FIGURE 7 provide continuous areas which are coated with a pressure sensitive adhesive, while the cellular recesses or areas 19 are uncoated.

Figure 5:
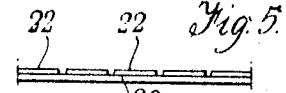
FIGURE 5 is an edge elevational view showing a modified form of the invention in which the thermoplastic sheet is embossed.
Figure 6:
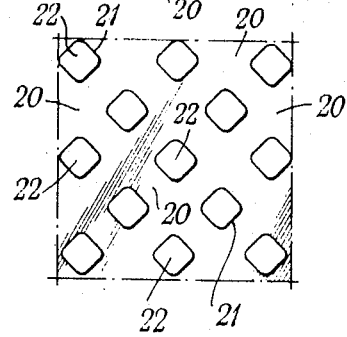
FIGURE 6 is a plan view of the embossed sheet as shown in FIGURE 5 illustrating the manner in which projections are formed on one surface of the sheet.

In FIGURES 5 and 6 the synthetic plastic sheet is embossed to provide a diamond pattern in which the surface areas 20 form low level areas, and projections 21 at their crossing points having upper level surfaces 22 which are separate one from the other.

The method of carrying out the invention is as follows:

Example I

In forming the synthetic resin sheet or film 17, a mixture of polyvinyl chloride, 50 lbs. by weight, with a plasticizer such as polypropylene sebacate, 50 lbs. by weight, is mixed with finely divided corn or maize starch, 150 lbs. by weight, and this mixture is agitated in a suitable jacketed internal mixer and then wetted with methyl cyclohexanone, 70 lbs. by weight, at an elevated temperature between 95 and 100° C. for two hours. The plastic mass thus formed is viscous and has a consistency similar to a dough-like mass.

The plastic mass thus formed is then extruded through the extrusion head of a suitable extrusion press at an elevated temperature to maintain the dough-like plastic mass at a consistency for working. The thus extruded sheet or film is then passed through an oven at 110° C. to remove the solvent. While the sheet or film is still in its semiplastic state or semi-solid condition, it is passed between embossing rollers or the like in which one of the rollers is provided with a design face, and the other roller or platen surface is smooth. The embossed sheet or film is then treated with water at 100° C. by passing the same through an immersion tank until the starch or corn particles have swollen. The sheet or film is then treated with an aqueous 5% caustic soda solution of another washing solution, and this is followed by treating the film with an aqueous solution of 5% sulphuric acid until the sheet or film is entirely free of starch. The sheet or film is then subjected to a solution of a wetting agent by immersion to remove the last traces of acid. The sheet or film will thus be embossed to provide high and low areas such as 19 and 20 in FIGURES 4 and 6 having projection ribs 18 (FIGURE 4) and diamond shaped projections 21 (FIGURE 6). Finally, the sheet is passed through a distributor including a submerged adhesive roller for applying pressure sensitive adhesive to the rib-like projections 18 or the projections 21. The adhesive roller is immersed in a tank containing a quantity of pressure sensitive adhesive of the rubber base type having a base of rubber repolymer and a petroleum solvent such as benzine in the proportions of 30% rubber composition to 70% benzine. By passing the film or sheet continuously over the surface of an adhesive immersion roller only the rib-like or high level projections 18 and 21 will be coated with adhesive, while the remaining portions or areas 19 and 20 will remain uncoated.

The completed product can then be cut or otherwise shaped to provide a surgical dressing shown in FIGURES 11 and 12, or may be formed into a long band of surgical dressing shown in FIGURES 13 and 14. Also, the completed product can be shaped to form a microporous film bandage illustrated in FIGURE 15, or a length of industrial or surgical tape shown in FIGURE 16.

Example II

In the second example of carrying out the method a polyvinyl chloride film is formed as before from similar amounts of polyvinyl chloride and polypropylene sebacate, and this is mixed with a soluble material such as sodium chloride in a jacketed internal mixer to the consistency of a plastic dough-like mass. This is wetted out with methyl cyclohexanone in the amount of 70 lbs. to form a mass having the consistency of heavy paint. This mixture is mixed for two hours at an elevated temperature of 80 to 100° C. The plastic mass formed is then extruded in an extrusion press through a suitable die head to produce a sheet or film having an approximate thickness of 0.005" to 0.05". The film is relatively thin and can be made as thick as 0.25" or within an operational range between the upper and lower limits of these dimensions. While the sheet or film is still in its plastic condition it is passed through an oven to remove some of the solvent at an elevated temperature of 110° C. After the film has thus been extruded it is permitted to harden and then passed through heated embossing rollers or the like having the desired design face to print one surface of the sheet or film with a suitable design to provide elevated rib-like projections or projections of a diamond design. Next, the plastic sheet or film after embossing is passed through an immersion tank of water at an elevated temperature of 100° C. which causes portions of the entrapped sodium chloride to be dissolved and thus form a microporous synthetic plastic film sheet or strip as shown in FIGURES 3 and 5.

The sheet strip or film is then fed to a transfer device for applying a pressure sensitive adhesive to the rib-like projections 18 of FIGURES 3 and 4 or the diamond shaped projections shown in FIGURES 5 and 6. The pressure sensitive adhesive is of the type sold by the Minnesota Mining & Manufacturing Company in bulk and consists of a rubber repolymer with a hydrocarbon solvent and has the consistency of glue as shown in the patented art. This adhesive is formed from butylene and a resin solvent having a propensity for maintaining the adhesive in a tacky condition. A protective layer can then be applied to the adhesive surfaces 23 and 24.

Example III

In the third example of carrying out the method, a polyvinyl chloride film is formed by a casting procedure. For this purpose a plastisol of polyvinyl chloride containing the removable filler is spread on to a release-coated carrier, whereby a laminate is produced. This laminate is then passed into a multi-zone curing oven in which the temperature of the laminate is raised sufficiently to cure the polyvinyl chloride plastisol.

The following is a typical range of temperatures for a six-zone oven:

| | Deg. F. |
|---|---|
| Zone 1 | 150 |
| Zone 2 | 190 |
| Zone 3 | 210 |
| Zone 4 | 270 |
| Zone 5 | 320 |
| Zone 6 | 345 |

The polyvinyl chloride plastisol has the following composition.

| | Parts by weight |
|---|---|
| Polyvinyl chloride resin | 12 |
| Sodium chloride | 30 |
| Plasticizer (modified neopentyl glycol/adipic acid polyester) | 9.6 |
| Stabilizer (epoxidized soyabean oil) | 0.96 |
| Silicone (solvent based water repellent) | 0.3 |
| Solvent naphtha | 3.25 |

The resulting film is then embossed on the paper carrier or stripped from the carrier and embossed in the manner described in Example II. The embossed film is then leached with water as in Example II and is thus made ready to receive a pressure sensitive adhesive which may be applied as in Example II.

The microporous embossed film sheet or strip thus formed provides an adhesive tape or the like having cellular recesses or passageways for the passage of air and thus ventilates the surface on which the adhesive tape or surgical dressing is applied. Various other types of synthetic plastic compositions can be employed in forming the sheet or strip such for instance, as various phenols and resins including cellulose acetate, styrene, cellulose butyrate, butylene, cellulose nitrate, ethyl cellulose, vinyl chloride and any of the lower alcohols such as methyl, ethyl, propyl, butyl or amyl alcohol can be used.

Different pressure sensitive adhesives may be substituted for the ones set forth in Examples I and II. Considerable success has been experienced by using pressure sensitive adhesives which are commercially obtainable such as those manufactured and sold by the Standard Oil Company of New Jersey known under the trademark as Esso Vistenex, which consists of poly-butyl iso-butylene, styrene copolymer, rubber repolymer, plasticizer and a filler. Other pressure sensitive adhesive compositions of a similar nature can be obtained from the Minnesota Mining & Manufacturing Company under different trade names, but they include a rubber repolymer, butylene resin, a solvent and a suitable filler. The solvent being of the hydrocarbon type such as benzine.

When making surgical dressings rectangular pieces of gauze is applied to the pressure sensitive adhesive containing areas as shown in the drawing, and this may be medicated in a well known manner.

Adhesive tapes, bandages, plasters and the like made in accordance with the invention can be used for a great variety of purposes, especially where it is desirable that the film backing thereof should be pervious to air.

However, they are particularly advantageous for surgical and medical purposes, and FIGURES 11 and 12 show an example of the use of an adhesive-coated film according to a method of the invention, as used for a surgical dressing.

In these figures, the thick lines 25 on one surface of the film 26 represent a diamond pattern of raised "lines" with an adhesive coating on the upper surface area thereof such, for example, as shown in FIGURE 9, to leave uncoated areas 27 which are at a lower level, while 28 is an absorbent pad of suitable material located centrally on and adherent to the adhesive coating, to leave a border portion all around the said pad, which border portion is readily adhered to the skin.

It should be emphasized that while the adhesive coating on the high-level areas is sufficient to secure and hold the dressing pad 28 in position, the uncoated areas of the border portion surrounding this pad allow the skin to "breathe." In FIGURE 12 the usual removable two-part overlapping protective covering 29–30 is shown dotted in position, ready for removal when the dressing is to be used.

FIGURES 13 and 14 show a similar surgical dressing to that shown in FIGURES 11 and 12, except that the microporous film 31 is a continuous band and the absorbent pad 32 is also continous and adhered to the crisscross adhesive coating "lines" 33 in the central longitudinal axis of the band, to leave parallel lateral borders.

Any desired lengths of this band can be cut off to form the particular surgical dressings required.

FIGURE 15 shows a portion of a surgical bandage, which can be in a continuous roll or of any desired length and width. It comprises the film 34 with the adhesive crisscross lines 35 and uncoated areas 36 at a lower level. It can be used as a bandage, for strapping purposes or for holding large dressings in position, or otherwise. When of the required dimensions, surgical plasters can be cut therefrom, or such plasters can be made up purposefully by the method of the invention.

In all suitable surgical and medical tapes, bandages, plasters and dressings and the like where it would be necessary or advantageous, the adhesive coating may be medicated.

Among other advantages of adhesive-coated microporous films for surgical tapes, bandages, dressings and the like, when made according to the present invention, over those hitherto made, are that thicker and stronger films can be used without seriously affecting the flexibility, and that the uncoated areas of the film, at the base of the depressions (in relation to the embossments) need only be relatively thin, thus increasing the porosity of the uncoated portions.

The tape such as shown in FIGURE 16 could be used for industrial, surgical or other purposes. It is made in accordance with the invention, with the adhesive-coated high-level areas arranged generally in the manner shown in FIGURE 10.

It consists of a strip 37 of the microporous film having high-level disconnected adhesive-coated areas 38 and low-level continuous uncoated areas 39. Such tapes could have the high-level coated areas, such for a example as shown in FIGURES 11 to 15.

Similarly, the dressings and the like such for example as shown in FIGURES 11 to 15 could have high-level coated areas such as shown in FIGURE 16.

The invention is not limited to the precise forms or details herein set forth, as these may be varied to suit particular requirements.

When the synthetic plastic sheet, strip or film material is embossed on one or both sides the section thickness of the low-level areas is materially decreased to form a thin web-like area from which the solvent filler can be easily removed during the washing step by immersion in a liquid immersion tank.

What I claim is:

1. A method of making microporous pressure sensitive adhesive film, sheets and tape from synthetic thermoplastic material which comprises mixing said thermoplastic material with a soluble filler, forming from said mixture a film, passing said film between co-acting embossing rolls to emboss at least one surface and form a design pattern thereon having high and low areas, removing said soluble filler from said film and finally coating said high areas only with a pressure sensitive adhesive.

2. In a method of making microporous synthetic thermoplastic pressures sensitive adhesive film sheets, strips and tapes, the steps of mixing synthetic thermoplastic material with a soluble filler, forming from said mixture a film of the desired thickness, embossing said film on at least one side to form a design pattern thereon having high and low level areas, said high and low level areas being uniformly arranged over the entire embossed surface of said film, removing said filler, and finally coating the high level areas only of said pattern design with a pressure sensitive adhesive.

3. A method as set forth in claim 1 in which the high level areas to be coated with adhesive are interconnected.

4. A method as set forth in claim 1 in which the low level areas of said pattern design embossed on said film are not coated and are interconnected.

5. A method for making a microporous film having an adhesive coating on one surface thereof as set forth in claim 2 in which the film is prepared in continuous form of the desired width, and is subsequently embossed, then the filler removed and then coated with the adhesive.

6. An adhesive tape and the like, comprising a film-like tape formed of thermoplastic material, a design pattern on at least one surface of said tape, providing high and low areas extending uniformly over the surface of said tape, and a coating of pressure sensitive adhesive on the high areas of said design pattern and uncoated low level areas surrounding said high level areas.

7. A surgical tape and the like comprising a film of thermo-setting plastic material having at least one of its surfaces provided with a design pattern extending uniformly over said surface to provide high and low areas, said high and low areas providing air passages, said film being provided with a series of minute openings, and a pressure sensitive adhesive coating on the high level areas only of said design pattern.

8. A method of producing microporous pressure sensitive adhesive film, comprising the steps of mixing a synthetic thermoplastic material with a soluble filler, forming a film from said mixture, embossing said film on at least one side surface thereof to form a design pattern having high and low level areas, removing said soluble filler from the film, coating said high level areas only with a pressure sensitive adhesive, dividing off a portion of desired shape of the coated film to form a backing for a surgical dressing, and securing to the adhesive surface of said divided-off portion an absorbent gauze pad of such shape, size and location as to leave border portions of the coated surface which project beyond the confines of the pad and serve for securing the dressing to the skin of the user.

9. A method of producing microporous pressure sensitive adhesive film, comprising the steps of mixing a synthetic thermoplastic material with a soluble filler, forming a film from said mixture, embossing said film on at least one side surface thereof to form a design pattern having high and low level areas, removing said soluble filler from the film, applying a key coating to said high level areas of the film, and coating said high level areas only with a pressure sensitive adhesive, said key coating acting as a bond between said adhesive coating and the thermoplastic material of the film.

10. A surgical tape and the like, comprising a film of thermo-setting plastic material having at least one of its surfaces provided with a design pattern extending uniformly over said surface to provide high and low areas, said high and low areas providing air passages, said film being provided with a series of minute openings therethrough, a pressure sensitive adhesive coating on the high level areas only of said design pattern, and a key coating intermediate said high level areas of the film and said adhesive coating to provide a bond.

References Cited
UNITED STATES PATENTS

| | | | |
|---|---|---|---|
| 2,667,436 | 1/1954 | Goepfert et al. | |
| 2,861,006 | 11/1958 | Salditt | 117—11 |
| 3,053,252 | 9/1962 | Wolf | 128—296 |

ADELE M. EAGER, Primary Examiner

U.S. Cl. X.R.

117—7, 26; 128—169; 161—132; 206—59